(12) United States Patent
Shahriari et al.

(10) Patent No.: US 12,122,200 B2
(45) Date of Patent: Oct. 22, 2024

(54) METHOD AND SYSTEMS FOR SYSTEMATIC TRAILER POSITION PLANNING AND CONTROL

(71) Applicant: GM GLOBAL TECHNOLOGY OPERATIONS LLC, Detroit, MI (US)

(72) Inventors: Mohammadali Shahriari, Markham (CA); Reza Zarringhalam, Whitby (CA); Tushita A. Sikder, Markham (CA); Paul A. Adam, Milford, MI (US); Tetyana V. Mamchuk, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 663 days.

(21) Appl. No.: 17/479,562

(22) Filed: Sep. 20, 2021

(65) Prior Publication Data

US 2023/0091406 A1    Mar. 23, 2023

(51) Int. Cl.
*B60D 1/24*     (2006.01)
*B60D 1/01*     (2006.01)
*B60W 30/12*    (2020.01)

(52) U.S. Cl.
CPC ............... *B60D 1/247* (2013.01); *B60D 1/01* (2013.01); *B60W 30/12* (2013.01); *B60W 2300/14* (2013.01); *B60W 2520/14* (2013.01); *B60W 2552/30* (2020.02)

(58) Field of Classification Search
CPC ............ B60D 1/247; B60D 1/01; B60D 1/24; B60W 30/10; B60W 30/12; B60W 2552/30
See application file for complete search history.

(56) References Cited

U.S. PATENT DOCUMENTS

| | | | |
|---|---|---|---|
| 9,849,878 B2* | 12/2017 | Lee ...................... | B62D 15/025 |
| 10,086,831 B2* | 10/2018 | Wasiek ................ | B60W 50/14 |
| 10,926,759 B2* | 2/2021 | Kasaiezadeh Mahabadi ............. | B60W 30/12 |
| 11,814,098 B2* | 11/2023 | Shahriari ............... | B62D 6/007 |
| 2019/0375399 A1* | 12/2019 | Kasaiezadeh Mahabadi ............. | G06V 20/56 |
| 2022/0250618 A1* | 8/2022 | Miller, Jr. ......... | B60W 50/0097 |
| 2022/0289292 A1* | 9/2022 | Shahriari ............. | B62D 15/025 |

* cited by examiner

*Primary Examiner* — Kevin Hurley
*Assistant Examiner* — Michael R Stabley
(74) *Attorney, Agent, or Firm* — Vivacqua Crane, PLLC

(57) ABSTRACT

A method for lane centering control of a host vehicle that is towing a trailer includes: determining in real time, by a controller of the host vehicle, a radius of curvature of a turn, wherein the host vehicle is approaching the turn; determining, by the controller, a trailer required offset based on the radius of the curvature of the turn to maintain the host vehicle and the trailer in a lane while the host vehicle and the trailer move along the turn; and controlling the host vehicle using the trailer offset to maintain the host vehicle and the trailer in a lane while the host vehicle and the trailer move along the turn. The method also allows the host vehicle to avoid encroaching vehicles.

18 Claims, 4 Drawing Sheets

METHOD AND SYSTEMS FOR SYSTEMATIC TRAILER POSITION PLANNING AND CONTROL

INTRODUCTION

The present disclosure relates to vehicle trailer control and, more particularly, to methods and systems for systematic trailer position planning and control.

Some vehicles may include advanced driver-assistance systems (ADAS). Such systems may be used when a vehicle is towing a trailer. It is therefore desirable to control the position of the trailer while the vehicle is using the ADAS.

SUMMARY

To control the trailer position, the present disclosure describes a methodology that controls the host vehicle to prevent trailer lane departure or lateral contact with other road actors in the absence of trailer measurements. In other words, in the presently disclosed methodology, no trailer measurements are necessary to control the host vehicle. In this method, the formulation of the offset required to center the trailer using the host vehicle solely uses the steering angle, the vehicle curvature, and the vehicle speed. This formulation may be used to calculate a Trailer Predictive Curvature Offset (TPCO) for lane centering applications. This method employs a predictive model-based trailer estimation, which aids in understanding the vehicle and trailer dynamics using the sensor measurements of the host vehicle. The presently disclosed method incorporates surrounding dynamic and static objects into the trajectory planning algorithm for reducing proximity and probability of trailer contact with other road actors. The present disclosure also relates to a localization algorithm for maintaining the trailer within the lane using historical camera lane marking information, articulated vehicle dynamics, hitch angle and trailer dimensions without adding trailer lane sensing cameras. The presently disclosed method allows accurate trailer position for ADAS, helps maintain the vehicle and the trailer within a lane, and minimizes the probability that the trailer move outside of the lane.

In an aspect of the present disclosure, a method for controlling a host vehicle that is towing a trailer includes: determining in real time, by a controller of the host vehicle, that the host vehicle is approaching a turn; determining, by the controller, a trailer offset based on a radius of a curvature of the turn to maintain the host vehicle and the trailer in a lane while the host vehicle and the trailer move along the turn; and controlling the host vehicle using the trailer offset to maintain the host vehicle and the trailer in the lane while the host vehicle and the trailer move along the turn.

In an aspect of the present disclosure, determining the trailer offset includes determining a trailer predicted curvature offset (TPCO) based on the radius of the curvature of the turn and vehicle's path curvature. The method further includes determining that a target vehicle is not encroaching into the lane and a potential lateral impact to the vehicle with trailer, while the host vehicle is approaching the turn. Controlling the host vehicle using the trailer offset includes controlling the host vehicle using the TPCO to provide a predetermined distance to the encroaching vehicle.

In an aspect of the present disclosure, a trailer hitch interconnects the host vehicle and the trailer. Determining the TPCO includes: determining a trailer hitch angle using host vehicle states and determining a heading of the host vehicle to a desired trajectory The TPCO is determined as a function of the trailer hitch angle, the heading of the host vehicle to the desired trajectory, and a distance from a center of gravity of the trailer to the trailer hitch.

In an aspect of the present disclosure, the trailer hitch angle is determined as a function of a turn radius of the host vehicle, the distance from the center of gravity of the trailer to the trailer hitch, a distance from the trailer hitch to a rear axle of the host vehicle, and a distance from a center of gravity of the host vehicle to the rear axle of the host vehicle, and the turn radius of the host vehicle is a function of the radius of the curvature of the turn.

In an aspect of the present disclosure, the trailer hitch angle is determined as a function of a vehicle yaw rate of the host vehicle, a vehicle forward speed of the host vehicle, the distance from the center of gravity of the trailer to the trailer hitch, a distance from the trailer hitch to a rear axle of the host vehicle, and a distance from a center of gravity of the host vehicle to the rear axle of the host vehicle.

In an aspect of the present disclosure, the method further includes determining and predicting the trailer lateral offset through hitch angle prediction using a vehicle yaw rate of the host vehicle along a prediction horizon.

In an aspect of the present disclosure, the vehicle yaw rate of the host vehicle may be determined using a sensor of the host vehicle.

In an aspect of the present disclosure, the vehicle yaw rate of the host vehicle is determined as a function of an understeer gradient of the host vehicle, the vehicle forward speed of the host vehicle, a distance of the center of gravity of the host vehicle to a front axle of the host vehicle, the distance from the center of gravity of the host vehicle to the rear axle of the host vehicle, and a road wheel angle of a plurality of front wheels of the host vehicle.

In an aspect of the present disclosure, the method further includes adding the TPCO to a center of the lane to adapt an adjusted center of the lane assuring centering the trailer as well as the vehicle.

In an aspect of the present disclosure, controlling the host vehicle includes maintain the trailer traveling along the adapted center of the lane.

In an aspect of the present disclosure, the method further includes continuously updating, in real time, the center of the lane using TPCO.

The present disclosure also describes a control system. In an aspect of the present disclosure, the control system includes a controller and a plurality of sensors in communication with the controller. The controller is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses.

Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
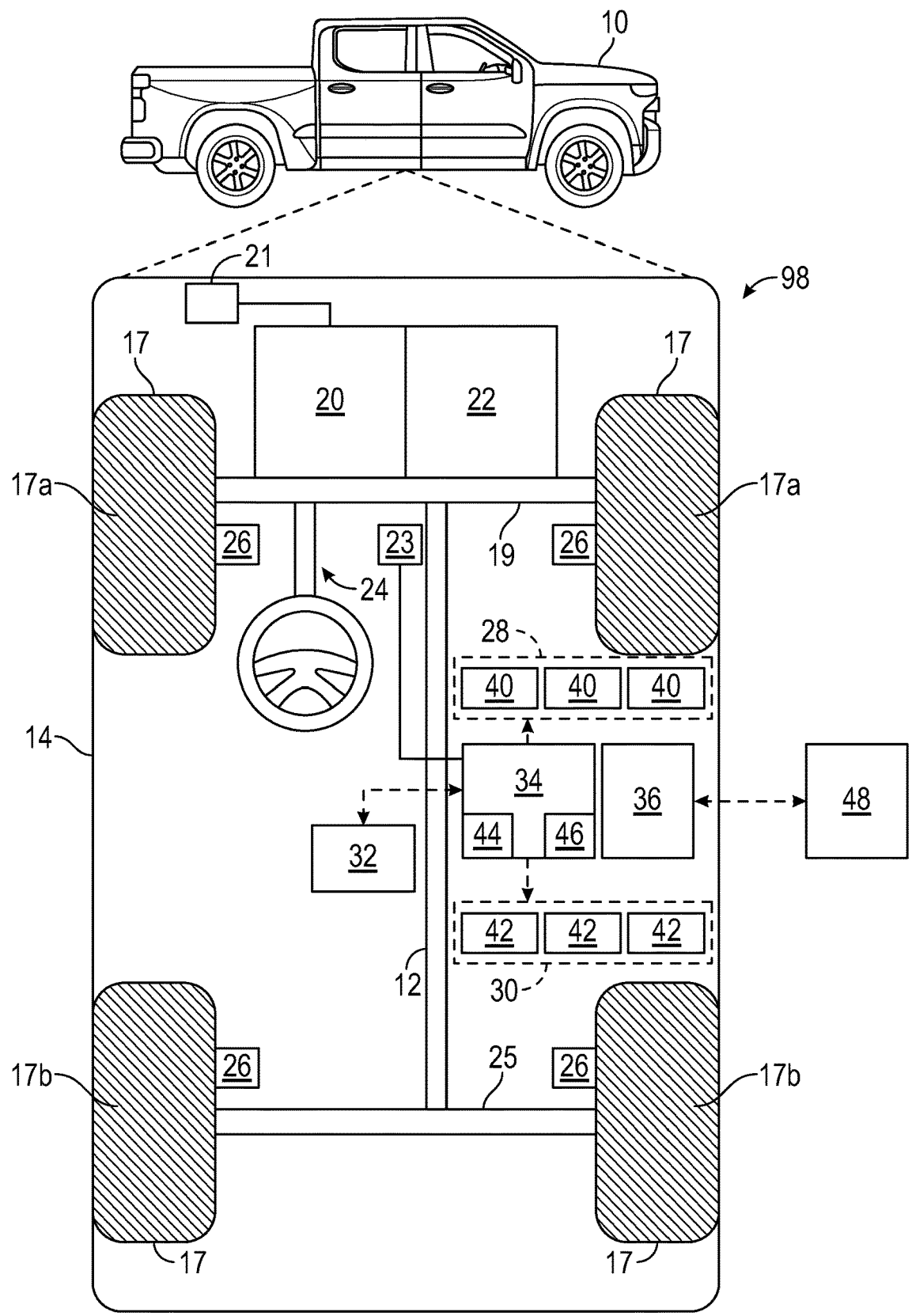
FIG. 1 is a schematic block diagram of a vehicle.

As depicted in FIG. 1, a vehicle 10 (which may be referred to as the host vehicle) generally includes a chassis 12, a body 14, front and rear wheels 17 and may be referred to as the host vehicle or a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle and a control system 98 is incorporated into the vehicle 10. The control system 98 may be simply referred to as the system. The vehicle 10 is, for example, a vehicle that is automatically controlled to carry passengers from one location to another. The vehicle 10 is depicted in the illustrated embodiment as a passenger car, but it should be appreciated that other vehicles including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more ground penetrating radar (GPR) sensors, one or more global positioning systems (GPS) devices, one or more cameras (e.g., optical cameras and/or thermal cameras, such as a rear camera and/or a front camera), speed sensor, steering angle sensor, ultrasonic sensors, one or more inertial measurement units (IMUs) and/or other sensors.

The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The sensor system 28 includes one or more Global Positioning System (GPS) transceiver configured to detect and monitor the route data (i.e., route information). The GPS device is configured to communicate with a GPS to locate the position of the vehicle 10 in the globe. The GPS device is in electronic communication with the controller 34. Because the sensor system 28 provides data to the controller 34, the sensor system 28 and its sensors 40 are considered sources of information (or simply sources).

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The controller 34 includes at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 may be configured as an alarm, such as a speaker to provide a sound, a haptic feedback in a vehicle seat or other object, a visual display, or other device suitable to provide a notification to the vehicle operator of the vehicle 10. The user interface 23 is in electronic communication with the controller 34 and is configured to receive inputs by a user (e.g., vehicle operator). Accordingly, the controller 34 is configured to receive inputs from the user via the user interface 23. The user interface 23 includes a display configured to display information to the user (e.g., vehicle operator or passenger) and may include one or more speakers to provide an auditable notification to the vehicle operator. The user interface 23 may be a driver information center (DIC) capable of providing information to the vehicle operator of the vehicle 10.

Figure 2:
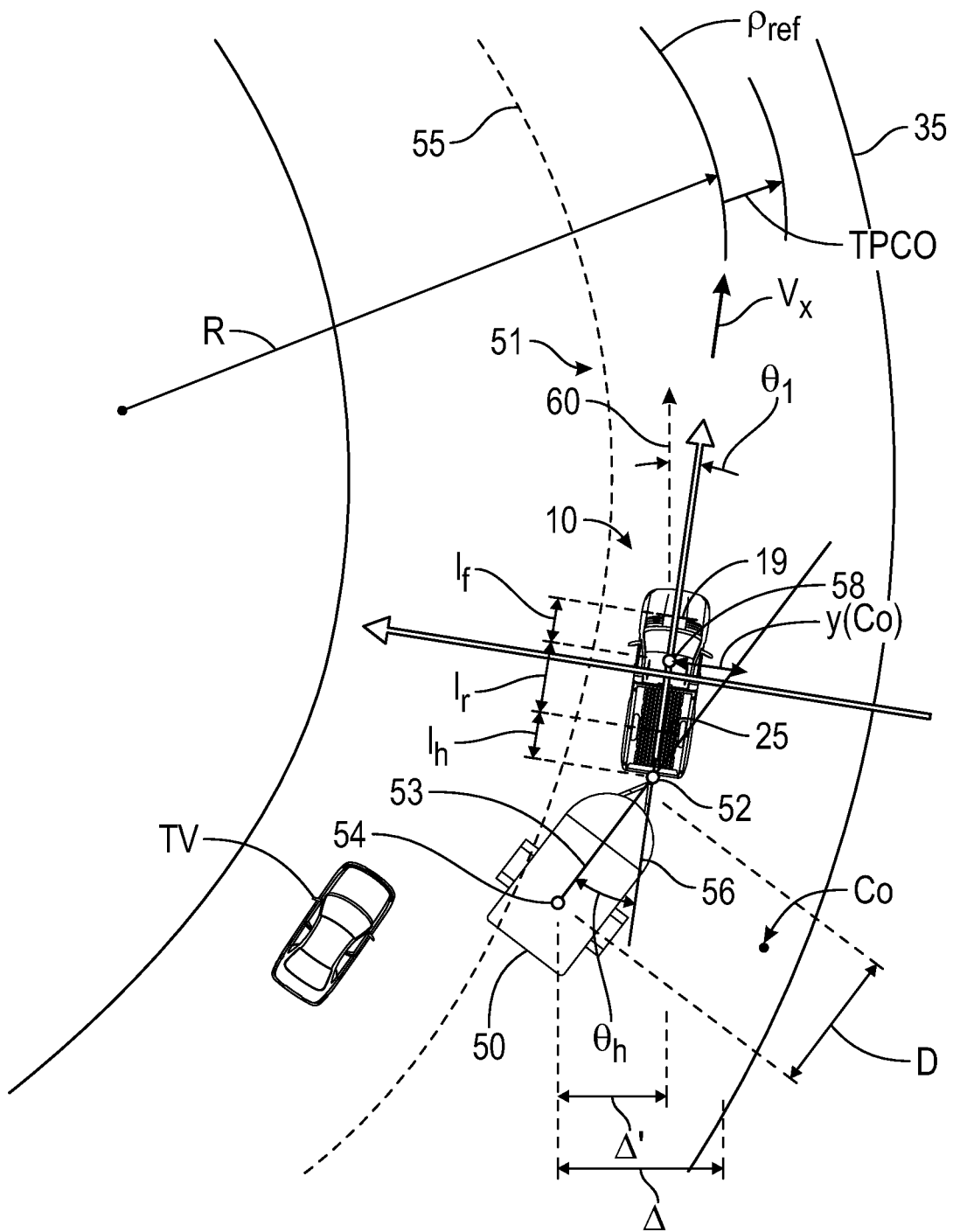
FIG. 2 is schematic diagram of the vehicle of FIG. 1 towing a trailer.

The communication system 36 is in communication with the controller 34 and is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system 36 is configured to wirelessly communicate information between the vehicle 10 and another vehicle. Further, the communication system 36 is configured to wirelessly communication information between the vehicle 10 and infrastructure or other vehicles.

With reference to FIG. 2, the vehicle 10 is configured to tow a trailer 50. A trailer hitch 52 interconnects the vehicle 10 and the trailer 50. The vehicle 10, the trailer 50, and the trailer hitch 52 may be collectively referred to as the vehicle assembly 51. The trailer 50 is elongated along a trailer longitudinal axis 53. The trailer longitudinal axis 53 intersects the center of gravity 54 of the trailer 50. The vehicle 10 is elongated along a vehicle longitudinal axis 56. The vehicle longitudinal axis 56 intersects the center of gravity 58 of the vehicle 10. Some factors and/or measurements are used to control the position of the trailer 50, including, but not limited to: the vehicle heading $\theta_1$ of the vehicle 10 to the desired trajectory relative to the magnetic north 60; the trailer hitch angle $\theta_h$ (which is the angle between the vehicle longitudinal axis 56 and the trailer longitudinal axis 53), the distance $l_h$ from the trailer hitch 52 to the rear axle 25 along the vehicle longitudinal axis 56; the distance $l_r$ from the center of gravity 58 of the vehicle 10 to the rear axle 25 along the vehicle longitudinal axis 56; the distance $l_f$ from the center of gravity 58 of the vehicle 10 to the front axle 19 along the vehicle longitudinal axis 56; the distance D from the center of gravity 54 of the trailer 50 to the trailer hitch 52 along the trailer longitudinal axis 53; the vehicle yaw rate $\omega_z$ of the vehicle 10; the vehicle forward speed $v_x$ of the vehicle 10; the lateral offset $y(C_0)$ of the vehicle 10 to the desired trajectory $C_0$, among others. The vehicle of the vehicle forward speed $v_x$ of the vehicle 10 may be obtained from one of the sensors 40, such as a speed sensor.

Figure 3:
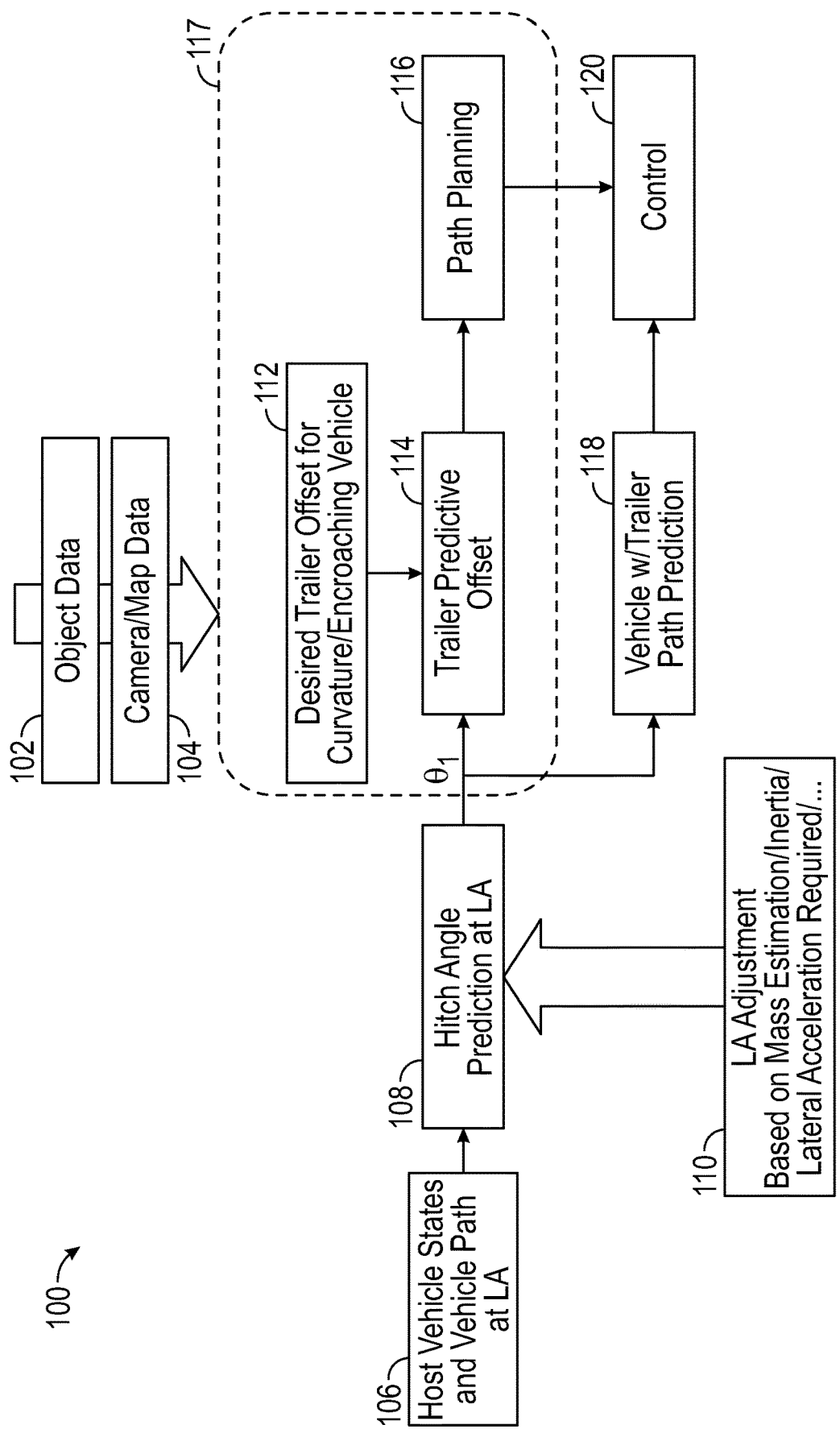
FIG. 3 is a flowchart of a method for systematic trailer position planning and control.
Figure 4:
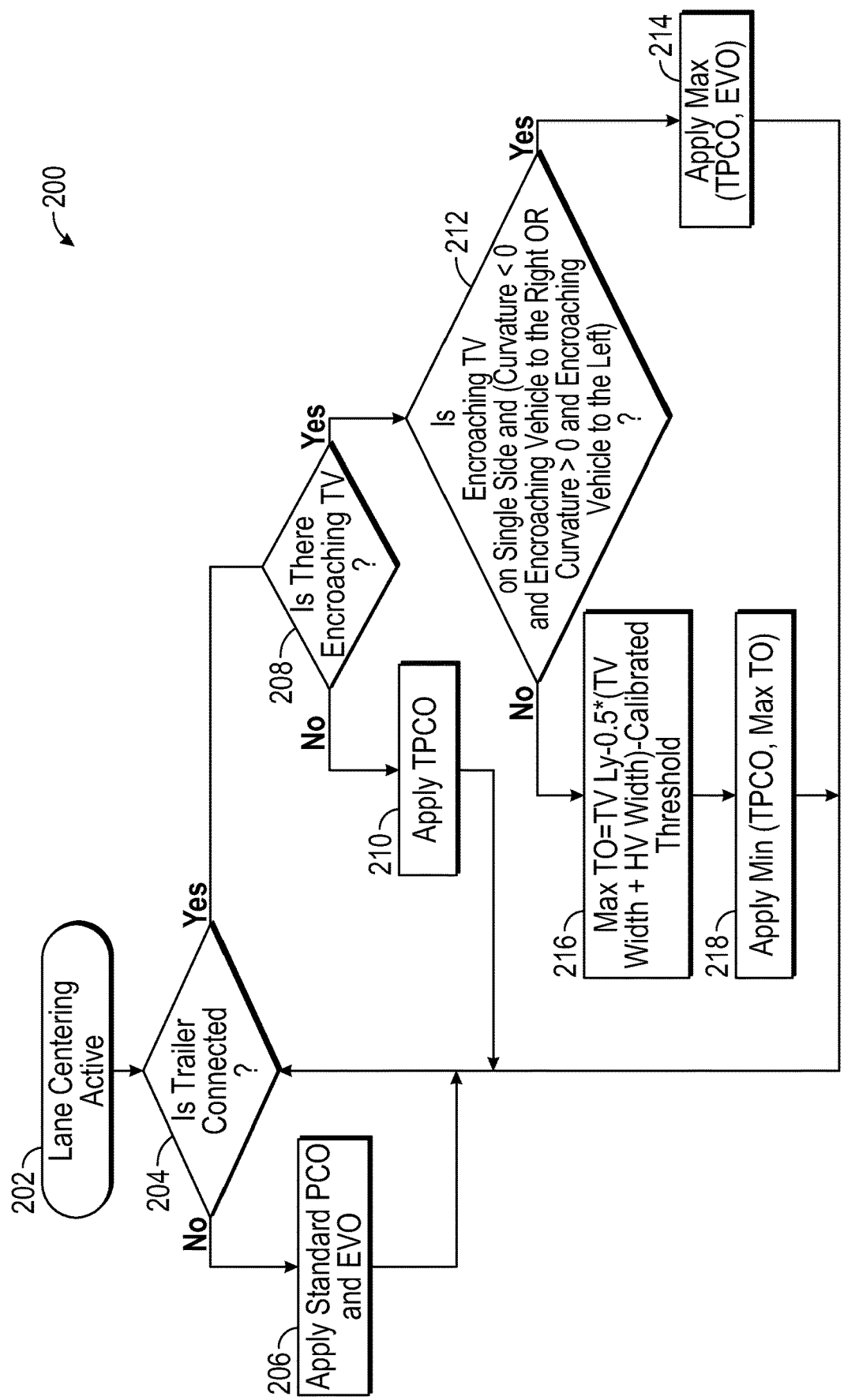
FIG. 4 is a flowchart of a process for determining a trailer offset.

With reference to FIG. 3, the control system 98 is configured to execute the method 100 for systematic trailer position planning and control. The method 100 begins at block 102. At block 102, the controller 34 receives object data from any sensor 40. The object data may be data pertaining to an object, such as data related to the vehicle 10, another vehicle (e.g., the target vehicle TV located near the host vehicle 10), or other objects. The method 100 then continues to block 104. At block 104, the controller 34 receives lane data from one or more sensors 40 (e.g., optical cameras and/or thermal cameras, such as a rear camera and/or a front camera) and/or map data from one or more sensors 40 (e.g., GPS devices and/or lidar).

The method 100 further includes block 106. At block 106, the controller 34 determines and/or receives from another processor the state of the vehicle 10 and the vehicle path at a look ahead (LA) position. The LA position is a position in the vehicle 10 in the future based on the vehicle path and may be determined by the ADAS of the vehicle 10. Then, the method 100 continues to block 108. At block 108, the controller 34 determines (e.g., estimates) the trailer hitch angle at the LA position.

To determine (e.g., estimate) the trailer hitch angle $\theta_h$ at the LA position, the controller 34 may use the following equation:

$$\theta_h = \frac{\omega_z}{v_x}(D + l_r + l_h)$$

where:
- $\theta_h$ is the trailer hitch angle;
- $l_h$ is the distance from the trailer hitch 52 to the rear axle 25 along the vehicle longitudinal axis 56;
- $l_r$ is the distance from the center of gravity 58 of the vehicle 10 to the rear axle 25 along the vehicle longitudinal axis 56;
- D is the distance from the center of gravity 54 of the trailer 50 to the trailer hitch 52 along the trailer longitudinal axis 53;
- $\omega_z$ is the vehicle yaw rate of the vehicle 10; and
- $v_x$ is the vehicle forward speed of the vehicle 10.

The vehicle forward speed $v_x$ of the vehicle 10 may be obtained from one of the sensors 40, such as wheel speed sensors. The distance $l_h$ from the trailer hitch 52 to the rear axle 25 along the vehicle longitudinal axis 56 may be predetermined based on the characteristics of the vehicle 10. The distance $l_r$ from the center of gravity 58 of the vehicle 10 to the rear axle 25 along the vehicle longitudinal axis 56 may be predetermined based on the characteristics of the vehicle 10. The distance D from the center of gravity 54 of the trailer 50 to the trailer hitch 52 along the trailer longitudinal axis 53 may be a predetermined design parameter which can be adjusted based on estimated mass or rearview perception (including camera, radar, sonars, . . . ). The vehicle yaw rate $\omega_z$ may be measured with a sensor 40, such as an IMU. Alternatively, during highway driving, the vehicle yaw rate $\omega_z$ may be determined (e.g., estimated) using the following equation:

$$\omega_z = \frac{\delta v_x}{K_{us}v_x^2 + l_f + l_r}$$

where:
- $\omega_z$ is the vehicle yaw rate of the vehicle 10;
- $K_{us}$ is the understeer gradient of the vehicle 10;
- $v_x$ is the vehicle forward speed of the vehicle 10;
- $l_r$ is the distance from the center of gravity 58 of the vehicle 10 to the rear axle 25 along the vehicle longitudinal axis 56;
- $l_f$ is the distance from the center of gravity 58 of the vehicle 10 to the front axle 19 along the vehicle longitudinal axis 56; and
- $\delta$ is the road wheel angle of the front wheels 17*a*.

The distance $l_f$ from the center of gravity 58 of the vehicle 10 to the front axle 19 along the vehicle longitudinal axis 56 may be predetermined based on the characteristics of the vehicle 10. The road wheel angle $\delta$ of the front wheels 17*a* may be derived from a sensor 40, such as a steering angle sensor. The understeer gradient $K_{us}$ of the vehicle 10 may be predetermined based on the characteristics of the vehicle 10.

The trailer hitch angle $\theta_h$ at the LA position may also be determined as a function of the radius R of the curvature $\rho_{ref}$ of the approaching turn 35, which can be obtained using a front camera module or map data. Specifically, the controller 34 may calculate the trailer hitch angle $\theta_h$ using following equation:

$$\theta_h = \frac{1}{R}(D + l_r + l_h)$$

where:
- $l_h$ is the distance from the trailer hitch 52 to the rear axle 25 along the vehicle longitudinal axis 56;
- $l_r$ is the distance from the center of gravity 58 of the vehicle 10 to the rear axle 25 along the vehicle longitudinal axis 56;
- D is the distance from the center of gravity 54 of the trailer 50 to the trailer hitch 52 along the trailer longitudinal axis 53; and
- R is the radius R of the curvature $\rho_{ref}$ of the approaching turn 35.

The method 100 also includes block 110. At block 110, the controller 34 determines a LA adjustment based on the mass of the vehicle 10 and trailer, the inertia of the vehicle 10, and the lateral acceleration necessary to drive along an approaching turn 35 (FIG. 2), such as a road turn. The controller 34 then applies the LA adjustment to the trailer hitch angle $\theta_h$ at the LA position to obtain an accurate trailer hitch angle $\theta_h$ at the LA position. The method 100 then proceeds to block 112.

At block 112, the controller 34 determines a desired trailer offset based either on curvature $\rho_{ref}$ of the approaching turn 35 (i.e., the turn 35 that the vehicle 10 is approaching) or on the fact that a target vehicle TV that is encroaching on the lane 55 that the vehicle 10 is traveling. To do so, the controller 34 may, for example, determine (e.g., calculate) a trailer predicted curvature offset (TPCO) using the following equation:

$$TPCO = \Delta' - D\sin(\theta_h + \theta_1) - \sin(\theta_h)(l_r + l_h)$$

where:
- $l_h$ is the distance from the trailer hitch 52 to the rear axle 25 along the vehicle longitudinal axis 56; and
- $l_r$ is the distance from the center of gravity 58 of the vehicle 10 to the rear axle 25 along the vehicle longitudinal axis 56.
- D is the distance from the center of gravity 54 of the trailer 50 to the trailer hitch 52 along the trailer longitudinal axis 53;
- $\Delta'$ is the lateral distance from the center of gravity 54 of the trailer 50 to the center of gravity 58 of the vehicle 10;
- $\theta_h$ is the trailer hitch angle;
- $\theta_l$ is the vehicle heading of the vehicle 10; and
- TPCO is the trailer predicted curvature offset.

In this method 100, the radius R of the curvature $\rho_{ref}$ of the approaching turn 35 may be determined based on data obtained from sensors 40, such as lidar and/or GPS devices in real time to calculate the TPCO. This presents the ability to look ahead and update the TPCO as the vehicle and trailer dynamics change. The lateral distance $\Delta'$ from the center of gravity 54 of the trailer 50 to the center of gravity 58 of the vehicle 10 may be determined using the following equation:

$$\Delta' = \Delta - y_h$$

where:
- Δ' is the lateral distance from the center of gravity 54 of the trailer 50 to the center of gravity 58 of the vehicle 10;
- Δ is the lateral distance from center of gravity 54 of the trailer 50 to the center $C_0$ of the lane 55; and
- $y_h$ is the lateral offset of the host vehicle 10.

After block 112, the method 100 continues to block 114. At block 114, the controller 34 determines the trailer offset to be used based on the determination on block 112. After block 114, the controller 34 plans the path to be taken by the vehicle 10 based on the trailer offset determined in block 114. At block 116, the path planning may entail determining an adjusted center $y_h$ of the lane 55 after applying the TPCO. To do so, the controller 34 may use the following equation:

$$C'_0 = TPCO + C_0$$

where:
- $C_0$ is the spatial center of the lane 55;
- TPCO is the trailer predicted curvature offset; and
- $C'_0$ is the adjusted center of the lane 55 after applying the TPCO At block 116, the controller 34 plans for the vehicle 10 to travel along the adjusted center $C'_0$ of the lane 55. As discussed above, the adjusted center $C'_0$ of the lane 55 is updated in real time based on data obtained from, for example, the sensors 40. Blocks 112, 114, and 116 may be collectively referred to as a mission planning onset arbitration 117.

The method 100 also includes block 118. At block 118, the controller 34 determines a path prediction for the vehicle 10 (along with the trailer 50) based on the vehicle heading $\theta_1$ of the vehicle 10 to the desired trajectory relative to the magnetic north 60. The method 100 then proceeds to block 120. At block 120, the controller 34 commands the steering system 24 to control the path prediction determined at block 118 and the path planning determined at block 116. For instance, the controller 34 commands the steering system 24 to maintain the vehicle 10 traveling along the adjusted center $C'_0$ of the lane 55.

As discussed above, block 112 entails determining the desired trailer offset based either on curvature $\rho_{ref}$ of the approaching turn 35 (i.e., the turn 35 that the vehicle 10 is approaching) or on the fact that a target vehicle TV that is encroaching on the lane 55 that the vehicle 10 is traveling. To do so, the controller 34 may execute the process 200.

The process 200 begins at block 202. At block 202, the controller 34 determines whether the lane centering feature is active. The vehicle operator may activate the lane centering feature through user interface 23. Then, the process 200 proceeds to block 204. At block 204, the controller 34 determines whether the trailer 50 is connected to the vehicle 10 and whether the vehicle 10 is approaching the turn 35 using the sensors 40, such as a camera. If the trailer 50 is connected to the vehicle 10, then the process 200 proceeds to block 206. At block 206, the controller 34 applies the standard predicted curvature offset (PCO) and the encroaching vehicle offset (EVO). However, if the trailer 50 is connected to the vehicle 10, then the process 200 proceeds to block 208.

At block 208, the controller 34 determines whether there is another vehicle (i.e., the target vehicle TV) encroaching in the lane 55 that the vehicle 10 is traveling on. If no other vehicle is encroaching in the lane 55, then the process 200 proceeds to block 210. At block 210, the controller 34 applies the TPCO. However, if the there is another vehicle (i.e., the target vehicle TV) encroaching in the lane 55 that the vehicle 10 is traveling on, then the process 200 proceeds to block 212.

At block 212, the controller 34 determines another vehicle (i.e., the target vehicle TV) is encroaching on a single side of the vehicle 10. To do so, the controller 34 determines whether the curvature $\rho_{ref}$ is less than zero and the encroaching vehicle (i.e., target vehicle TV) is on the right of the vehicle 10 or whether the curvature $\rho_{ref}$ is greater than zero and the encroaching vehicle is on the left of the vehicle 10. The sign convention refers to the ISO coordinate system. Thus, negative curvature means that the road is curving to the right, and positive curvature means that the road is curving to the left. If the curvature $\rho_{ref}$ is less than zero and the encroaching vehicle is on the right of the vehicle 10 or the curvature $\rho_{ref}$ is greater than zero and the encroaching vehicle is on the left of the vehicle 10, then the process 200 continues to block 214. At block 214, the controller 34 applies the maximum of the TPCO and the EVO. However, if the curvature $\rho_{ref}$ is not less than zero and the encroaching vehicle is on the right of the vehicle 10 or the curvature $\rho_{ref}$ is not greater than zero and the encroaching vehicle is on the left of the vehicle 10, then the process 200 continues to block 216.

At block 216, controller 34 determines the maximum trailer offset Max TO allowed in the presence of an encroaching vehicle. The Max TO may be determined using the following equation:

$$\text{Max } TO = TV\, Ly - 0.5(TV\, \text{Width} + HV\, \text{Width}) - \text{Calibrated Threshold}$$

where:
- Max TO is the maximum trailer offset allowed in the presence of an encroaching vehicle;
- TV Ly is the lateral position of the target vehicle TV (i.e., another vehicle that is encroaching into the lane where the vehicle 10 is traveling);
- TV Width is the width of the target vehicle TV (i.e., another vehicle that is encroaching into the lane where the vehicle 10 is traveling);
- HV Width is the width of the vehicle 10 (i.e., the host vehicle); and
- Calibrated Threshold is a threshold determined through calibration.

After block 216, the process 200 continues to block 218. At block 218, the controller 34 applies the minimum of TPCO and Max TO.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a host vehicle that is towing a trailer, comprising:
   determining in real time, by a controller of the host vehicle, that the host vehicle is approaching a turn;
   determining, by the controller, a trailer offset based on a radius of a curvature of the turn to maintain the host vehicle and the trailer in a lane while the host vehicle and the trailer move along the turn; and controlling the host vehicle using the trailer offset to maintain the host vehicle and the trailer in the lane while the host vehicle and the trailer move along the turn;

wherein:
determining the trailer offset includes determining a trailer predicted curvature offset (TPCO) based on the radius of the curvature of the turn and vehicle's path curvature;
the method further comprises determining that a target vehicle is not encroaching into the lane and a potential lateral impact to the vehicle with the trailer, while the host vehicle is approaching the turn; and
controlling the host vehicle using the trailer offset includes controlling the host vehicle using the TPCO to provide a predetermined distance to the encroaching vehicle.

2. The method of claim 1, wherein:
a trailer hitch interconnects the host vehicle and the trailer; and
determining the TPCO includes:
determining a trailer hitch angle using host vehicle states;
determining a heading of the host vehicle to a desired trajectory; and
the TPCO is determined as a function of the trailer hitch angle, the heading of the host vehicle to the desired trajectory, and a distance from a center of gravity of the trailer to the trailer hitch.

3. The method of claim 2, wherein the trailer hitch angle is determined as a function of a turn radius of the host vehicle, the distance from the center of gravity of the trailer to the trailer hitch, a distance from the trailer hitch to a rear axle of the host vehicle, and a distance from a center of gravity of the host vehicle to the rear axle of the host vehicle, and the turn radius of the host vehicle is a function of the radius of the curvature of the turn.

4. The method of claim 2, wherein the trailer hitch angle is determined as a function of a vehicle yaw rate of the host vehicle, a vehicle forward speed of the host vehicle, the distance from the center of gravity of the trailer to the trailer hitch, a distance from the trailer hitch to a rear axle of the host vehicle, and a distance from a center of gravity of the host vehicle to the rear axle of the host vehicle.

5. The method of claim 4, further comprising determining and predicting the trailer lateral offset through hitch angle prediction using a vehicle yaw rate of the host vehicle along a prediction horizon.

6. The method of claim 5, wherein the vehicle yaw rate of the host vehicle may be determined using a sensor of the host vehicle.

7. The method of claim 5, wherein the vehicle yaw rate of the host vehicle is determined as a function of an understeer gradient of the host vehicle, the vehicle forward speed of the host vehicle, a distance of the center of gravity of the host vehicle to a front axle of the host vehicle, the distance from the center of gravity of the host vehicle to the rear axle of the host vehicle, and a road wheel angle of a plurality of front wheels of the host vehicle.

8. The method of claim 7, further comprising adding the TPCO to a center of the lane to adapt an adjusted center of the lane assuring centering the trailer as well as the vehicle.

9. The method of claim 8, wherein controlling the host vehicle includes maintain the trailer traveling along the adapted center of the lane.

10. The method of claim 9, further comprising continuously updating, in real time, the center of the lane using TPCO.

11. A control system of a host vehicle, comprising:
a controller;
a plurality of sensors in communication with the controller;
wherein the controller is programmed to:
determine in real time that the host vehicle is approaching a turn;
determine a trailer offset based on a radius of a curvature of the turn to maintain the host vehicle and the trailer in a lane while the host vehicle and the trailer move along the turn; and
controlling the host vehicle using the trailer offset to maintain the host vehicle and the trailer in the lane while the host vehicle and the trailer move along the turn;
determine a trailer predicted curvature offset (TPCO) based on the radius of the curvature of the turn and vehicle's path curvature;
determine that a target vehicle is not encroaching into the lane and a potential lateral impact to the vehicle with trailer, while the host vehicle is approaching the turn; and
command the host vehicle using the TPCO to provide a predetermined distance to the encroaching vehicle.

12. The control system of claim 11, wherein:
a trailer hitch interconnects the host vehicle and the trailer; and
the controller is programmed to:
determine a trailer hitch angle using host vehicle states;
determine a heading of the host vehicle to a desired trajectory; and
wherein the TPCO is determined as a function of the trailer hitch angle, the heading of the host vehicle to the desired trajectory, and a distance from a center of gravity of the trailer to the trailer hitch.

13. The control system of claim 12, wherein the trailer hitch angle is determined as a function of a turn radius of the host vehicle, the distance from the center of gravity of the trailer to the trailer hitch, a distance from the trailer hitch to a rear axle of the host vehicle, and a distance from a center of gravity of the host vehicle to the rear axle of the host vehicle, and the turn radius of the host vehicle is a function of the radius of the curvature of the turn.

14. The control system of claim 12, wherein the trailer hitch angle is determined as a function of a vehicle yaw rate of the host vehicle, a vehicle forward speed of the host vehicle, the distance from the center of gravity of the trailer to the trailer hitch, a distance from the trailer hitch to a rear axle of the host vehicle, and a distance from a center of gravity of the host vehicle to the rear axle of the host vehicle.

15. The control system of claim 14, wherein the controller is programmed to determine and predict a trailer lateral offset through hitch angle prediction using a vehicle yaw rate of the host vehicle along a prediction horizon.

16. The control system of claim 15, wherein the vehicle yaw rate of the host vehicle may be determined using a sensor of the host vehicle.

17. The control system of claim 16, wherein the controller is programmed to add the TPCO to a center of the lane to adapt an adjusted center of the lane assuring centering the trailer as well as the vehicle.

18. The control system of claim 15, wherein the vehicle yaw rate of the host vehicle is determined as a function of an understeer gradient of the host vehicle, the vehicle forward speed of the host vehicle, a distance of the center of gravity of the host vehicle to a front axle of the host vehicle, the distance from the center of gravity of the host vehicle to the rear axle of the host vehicle, and a road wheel angle of a plurality of front wheels of the host vehicle.

* * * * *